United States Patent
Yanagi et al.

(10) Patent No.: US 9,868,645 B2
(45) Date of Patent: Jan. 16, 2018

(54) METHOD FOR PRODUCING PARTICLES

(71) Applicant: TOYOTA JIDOSHA KABUSHIKI KAISHA, Toyota-shi, Aichi-ken (JP)

(72) Inventors: Takuo Yanagi, Toyota (JP); Hirokazu Kawaoka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/347,441

(22) Filed: Nov. 9, 2016

(65) Prior Publication Data

US 2017/0152150 A1 Jun. 1, 2017

(30) Foreign Application Priority Data

Nov. 30, 2015 (JP) ................. 2015-234136

(51) Int. Cl.
  *C01D 15/04* (2006.01)
  *C01B 17/36* (2006.01)
  *B01D 9/00* (2006.01)

(52) U.S. Cl.
  CPC ........... *C01D 15/04* (2013.01); *B01D 9/0031* (2013.01); *B01D 9/0054* (2013.01); *C01B 17/36* (2013.01)

(58) Field of Classification Search
  CPC .... C01D 15/04; B01D 9/0031; B01D 9/0054; C01B 17/36
  USPC .......................................... 23/296
  See application file for complete search history.

(56) References Cited

U.S. PATENT DOCUMENTS

2014/0272554 A1  9/2014  Yanagi et al.

FOREIGN PATENT DOCUMENTS

| JP | H07-316087 A | 12/1995 |
| JP | 2001-104703 A | 4/2001 |
| JP | 2003-265901 A | 9/2003 |
| JP | 2009-297668 A | 12/2009 |
| JP | 2014-179265 A | 9/2014 |

OTHER PUBLICATIONS

U.S. Appl. No. 15/205,070, filed Jul. 8, 2016.

*Primary Examiner* — Edward Johnson
(74) *Attorney, Agent, or Firm* — Oliff PLC

(57) ABSTRACT

The object of the disclosure is to provide a method for efficiently producing fine particles with low crystal growth of the raw material components, in particular fine particles with a plurality of raw material components in a highly complexed state and having low crystal growth, without blockage of the nozzle. The method of the disclosure for producing particles includes injecting a good solvent solution that includes a good solvent and one or more raw material components dissolved in the good solvent, with a nozzle into a precipitating poor solvent that has been heated to a temperature higher than the boiling point of the good solvent, to evaporate the good solvent solution and precipitate a plurality of particles, and running a cleansing poor solvent through the nozzle before starting and after completing injection of the good solvent solution into the precipitating poor solvent.

12 Claims, 3 Drawing Sheets

METHOD FOR PRODUCING PARTICLES

CROSS-REFERENCE TO RELATED APPLICATION

This application claims priority to Japanese Patent Application No. 2015-234136 filed on Nov. 30, 2015, the entire contents of which are hereby incorporated by reference into the present application.

TECHNICAL FIELD

The present disclosure relates to a method for producing particles, in particular fine particles having multiple components complexed to a high degree.

BACKGROUND ART

Conventional techniques for precipitating particles from solution include methods in which a solution is heated in a container to evaporate off and remove the solvent and obtain particles (hereunder referred to as "dry evaporation methods"), methods in which a solution is sprayed into hot air to evaporate the solvent in a gas phase, and precipitate particles as a dry powder (hereunder referred to as "spray dry methods"), and methods in which a solution of a solute dissolved in a good solvent is added dropwise to a heated poor solvent and the good solvent is evaporated off, to obtain a slurry of the particles and the poor solvent (hereunder referred to as "common methods using a good solvent and poor solvent").

Specific examples of common methods using a good solvent and poor solvent are described in PTL 1. PTL 1 discloses a method for producing 2,2-bis[3,5-dibromo-4-(2, 3-dibromopropoxy)phenyl]propane (hereunder abbreviated as TBA-BP), in the form of needle crystals that have excellent thermal stability and storage stability, as well as an improved powder flow property.

Also, PTL 2 provides a diagram illustrating the principle of the publicly known dropping reprecipitation method.

CITATION LIST

Patent Literature

[PTL 1] Japanese Unexamined Patent Publication HEI No. 7-316087
[PTL 2] Japanese Unexamined Patent Publication No. 2009-297668

SUMMARY

Dry evaporation methods, spray dry methods and common methods using a good solvent and poor solvent are all employed as methods for precipitating particles. In such methods, the rate of solvent evaporation is relatively slow. Therefore, the particles precipitate slowly by crystal growth, and it is difficult to obtain particles with low crystal growth.

In particular, when particles are precipitated from a solution in which a plurality of raw material components have been dissolved, the raw material components precipitate as separate crystals with low solubility, and it is therefore difficult to obtain fine particles with the plurality of raw material components in a highly complexed state. The aforementioned methods are therefore poorly efficient when the goal is to produce fine particles comprising a plurality of raw material components in a highly complexed state.

As a result of research conducted by the present inventors, a method was found by which fine particles with a plurality of raw material components in a highly complexed state can be obtained by using a nozzle for injection of a good solvent solution in which a plurality of raw material components are dissolved, into a poor solvent that has been heated to high temperature.

However, it was also found that if the temperature of the poor solvent is too high, in some cases, the nozzle becomes blocked within a short period of time from the start of injection and the good solvent solution can no longer be further injected.

It is therefore an object of the present disclosure to provide a method for efficiently producing fine particles with low crystal growth of the raw material components, and particularly fine particles with a plurality of raw material components in a highly complexed state and having low crystal growth, without blockage of the nozzle.

The means for solving the problems according to the disclosure are as follows.

A method for producing particles, the method comprising injecting a good solvent solution that comprises a good solvent and one or more raw material components dissolved in the good solvent, through a nozzle into a precipitating poor solvent that has been heated to a temperature than the boiling point of the good solvent, to evaporate the good solvent and precipitate a plurality of particles, and running a cleansing poor solvent through the nozzle before starting and after completing injection of the good solvent solution into the precipitating poor solvent.

In embodiments, the method further comprises running the good solvent solution and the cleansing poor solvent through the nozzle in an alternating manner.

In embodiments, the method further comprises mixing the good solvent solution and the cleansing poor solvent and running them through the nozzle.

In embodiments, the cleansing poor solvent has a boiling point that is at or above the temperature of the precipitating poor solvent that has been heated.

In embodiments, the cleansing poor solvent and the precipitating poor solvent are the same.

In embodiments, the temperature of the precipitating poor solvent that has been heated is at least 165° C. higher than the boiling point of the good solvent.

In embodiments, a plurality of different raw material components are dissolved in the good solvent.

In embodiments, the plurality of raw material components are lithium sulfide and lithium halides.

In embodiments, the lithium halides are lithium iodide and lithium bromide.

In embodiments, the good solvent solution is in the state of a slurry further comprising at least one type of raw material component in powdered form, dispersed in the good solvent.

In embodiments, the concentration of the one or more raw material components in the good solvent solution is 10 g/l or greater.

In embodiments, the flow rate of the good solvent during injection of the good solvent solution into the precipitating poor solvent is between 5 ml/min and 10 ml/min, inclusive.

According to the disclosure it is possible to provide a method for efficiently producing fine particles with low crystal growth of the raw material components, and particularly fine particles with a plurality of raw material components in a highly complexed state and having low crystal growth, without blockage of the nozzle.

DETAILED DESCRIPTION

Embodiments of the disclosure will now be explained in detail. The disclosure is not limited to the embodiments described below, however, and various modifications may be implemented within the scope of the gist thereof.

The method of the disclosure for producing particles comprises injecting a good solvent solution that comprises a good solvent and a raw material component dissolved in the good solvent, through a nozzle, into a precipitating poor solvent that has been heated to a higher temperature than the boiling point of the good solvent, to evaporate the good solvent and precipitate a plurality of particles, and running a cleansing poor solvent through the nozzle before starting injection of the good solvent solution into the precipitating poor solvent, and after injection is complete.

Figure 1:
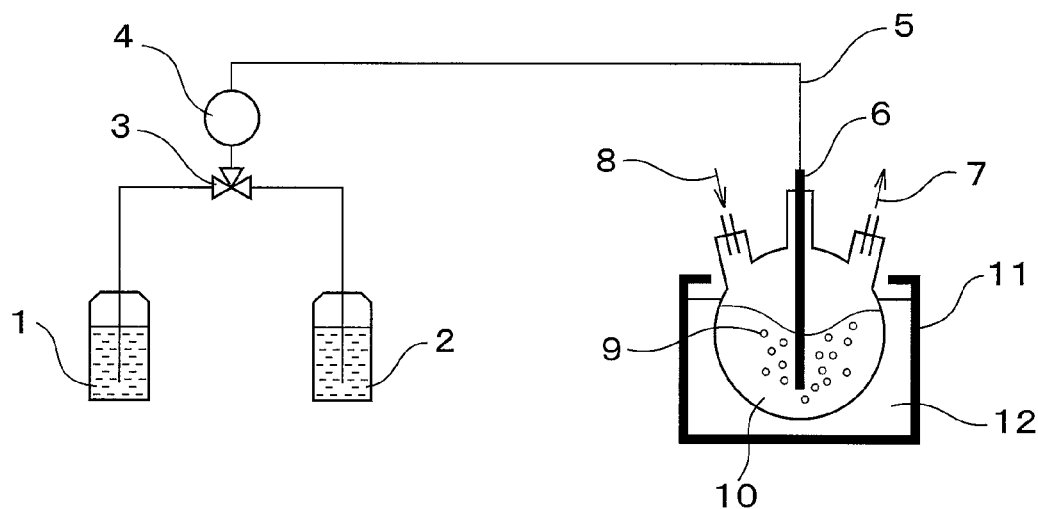
FIG. 1 is a schematic diagram showing an example of an apparatus for carrying out an embodiment of the method of the disclosure.

The method of the disclosure can be carried out by the mode illustrated in FIG. 1, for example.

First, the precipitating poor solvent (10) in the container used to precipitate the particles is heated to a prescribed temperature higher than the boiling point of the good solvent solution (1), using an oil bath (11) containing the heated oil (12). Next, a switching valve (3) is set to that the cleansing poor solvent (2) flows. A pump (4) is then activated to cause the cleansing poor solvent (2) to flow through tubing (5) into a nozzle (6). Next, the switching valve (3) is switched to allow flow of the good solvent solution (1), and the good solvent solution (1) is caused to flow through the tubing (5) into the nozzle (6). The cleansing poor solvent (2) and the good solvent solution (1) that have flowed into the nozzle (6) are injected into the precipitating poor solvent (10) from the tip of the nozzle (6), by the pressure of a pump (4).

The good solvent of the good solvent solution (1) that has been injected into the precipitating poor solvent (10) evaporates by the heat of the precipitating poor solvent (10), becoming good solvent vapor (9). Simultaneously, the fine particles of the raw material component precipitate in the good solvent solution (1). Also, the good solvent vapor (9), together with Ar gas (8) which is being constantly introduced into a precipitating container, is discharged from the container used to precipitate the particles, as a gaseous mixture (7) of Ar gas and the good solvent vapor. FIG. 1 shows merely one embodiment of the disclosure, and is not intended to limit the method of the disclosure.

While it is not our intention to be restricted to any particular principle, it is believed that the principle of action according to the disclosure is as follows.

In a method of precipitating a plurality of raw material components as particles in a solution by evaporation of the solvent in the solution, a slow evaporation rate of the solvent causes the raw material components to grow and precipitate as separate particles according to their solubilities, as large particles with few defects. In such a method, however, if the evaporation rate of the solvent is sufficiently rapid, the raw material components precipitate as highly complexed particles without being separated according to solubility, and without crystal growth.

According to the disclosure, the good solvent solution in which the plurality of raw material components are dissolved in a good solvent is contacted, through the nozzle, with the poor solvent that has been heated to high temperature, instantaneously evaporating the good solvent in the poor solvent. The evaporation rate of the good solvent in the good solvent solution is therefore rapid. As a result, the raw material component precipitates without being separated according to solubility, as highly complexed fine particles without crystal growth. Also, even when the good solvent solution is in the form of a slurry further containing at least one type of starting powder dispersed in the good solvent, it is possible to obtain highly complexed fine particles containing the raw material component powder. In such cases, the starting powder preferably becomes disaggregated when the good solvent has evaporated, forming fine particles together with the raw material components precipitating from the good solvent solution.

A higher concentration of raw material components dissolved in the good solvent solution will allow the raw material components to be recovered in a more highly complexed state. This is because a higher concentration of dissolved raw material components further increases the viscosity of the solution, resulting in inhibition of movement of the ions in the solution, and when the good solvent has been evaporated, the raw material components tend to precipitate by crystallization without changing their arrangement in the solution.

In contrast, in a dry evaporation method, a spray dry method or a common method using a good solvent and poor solvent, it is not possible to efficiently recover highly complexed fine particles, presumably for the following reason.

With a dry evaporation method, the evaporation rate of the solvent is slow and therefore large particles precipitate, that have undergone slow crystal growth. Consequently, in a dry evaporation method it is difficult to recover fine particles with a plurality of raw material components in a highly complexed state.

With a spray dry method, the solvent can be evaporated more rapidly than by a dry evaporation method, but since the rate at which the solvent evaporates is not sufficient, the particles in the gas phase collide with other particles and aggregate while drying, with the precipitated particles aggregating on the container bottom. Consequently, it is difficult to recover fine particles with a plurality of raw material components in a highly complexed state.

With a common method using a good solvent and a poor solvent, when the good solvent solution is dropped into the poor solvent, the good solvent solution at first mixes with the poor solvent, forming a mixed solution. The good solvent then evaporates gradually upon heating of the poor solvent, and escapes from the mixed solution. In this case, since the rate at which the good solvent escapes is slow, the raw material component precipitates as large particles with crystal growth. Also, since the raw material components slowly precipitate in order of lowest solubility, they precipitate as mutually separate particles and are difficult to precipitate as a complex. Consequently, it is difficult to recover fine particles with a plurality of raw material components in a highly complexed state.

Incidentally, when the good solvent solution is injected into a precipitating poor solvent using a nozzle, there is a case that the nozzle becomes blocked after several seconds from the start of injection, making it difficult for the good solvent solution to be further injected into the poor solvent solution. Such blockage may occur by the following principle, for example.

Figure 2:
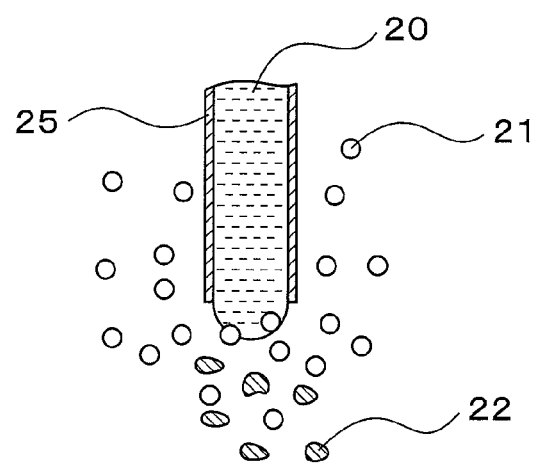
FIG. 2 is a schematic diagram illustrating the use of a nozzle to cause a good solvent solution to flow into a precipitating poor solvent and precipitate particles.
Figure 3:
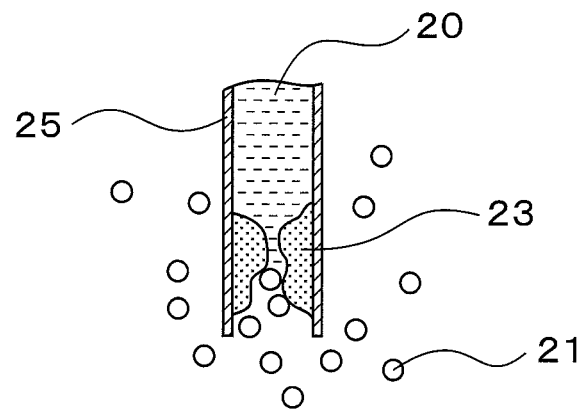
FIG. 3 is a schematic diagram showing the mechanism of blockage of the nozzle when a good solvent solution is caused to flow into a precipitating poor solvent using the nozzle.

FIG. 2 and FIG. 3 are schematic diagrams showing the periphery of the nozzle tip when the good solvent solution is injected into the precipitating poor solvent using the nozzle. In FIGS. 2 and 3, the tip section of the nozzle enters into the precipitating poor solvent that has been heated to a higher temperature than the boiling point of the good solvent. While not specifically shown in FIGS. 2 and 3, it is to be understood that the precipitating poor solvent is present around the periphery of the nozzle.

FIG. 2 is a schematic diagram of the periphery of the nozzle tip when the nozzle is not blocked. In FIG. 2, the good solvent solution (20) is injected into the precipitating poor solvent through the nozzle (25). The good solvent solution (20) contacts with the precipitating poor solvent at the tip section of the nozzle (25). When the temperature of the precipitating poor solvent that has been heated is sufficiently high, the good solvent in the good solvent solution evaporates instantly at the tip section of the nozzle (25), forming good solvent vapor (21). Simultaneously, the fine particles (22) of the raw material component precipitate from the good solvent solution (20) into the precipitating poor solvent.

FIG. 3 is a schematic diagram of the periphery of the tip of the nozzle (25) when the nozzle (25) is blocked. For example, with a low flow rate of the good solvent solution (20), or when the temperature of the precipitating poor solvent is much higher than the boiling point of the good solvent, and the nozzle (25) is utilized to inject the good solvent solution (20) into the precipitating poor solvent, such blockage of the nozzle (25) may occur. When the flow rate of the good solvent solution (20) is low, or when the temperature of the precipitating poor solvent is much higher than the boiling point of the good solvent (20), the evaporation rate of the good solvent in the good solvent solution (20) is higher than the flow rate of the good solvent solution (20), and the precipitating poor solvent becomes trapped in the nozzle (25), as illustrated in FIG. 3. In this case, the good solvent solution (20) contacts with the precipitating poor solvent in the nozzle (25), and the raw material component in the good solvent solution (20) forms crystals and precipitates in the nozzle (25). The nozzle interior becomes blocked by crystals (23) of the raw material component precipitated on the nozzle inner wall.

Blockage of the nozzle presumably occurs with a high evaporation rate of the good solvent with respect to the flow of the good solvent solution inside the nozzle, when the good solvent evaporates inside the nozzle. A specific example of such a case is one in which the flow rate of the good solvent solution is reduced immediately after initial injection of the good solvent solution into the precipitating poor solvent solution, or after completion of the injection. Lowering the flow rate of the good solvent solution into the precipitating poor solution in order to maintain the temperature of the precipitating poor solvent when the temperature of the precipitating poor solvent has been lowered by injection of the good solvent solution is also the example of such a case.

The present inventors have found that flow of the cleansing poor solvent into the nozzle immediately before injection of the good solvent solution into the precipitating poor solvent by the nozzle, and after completion of injection, can prevent blockage of the nozzle during injection of the good solvent solution and after completion of injection. By carrying out this method, it is possible to inject the good solvent solution into the precipitating poor solvent after the flow rate of the liquid flowing through the nozzle has stabilized, and injection of the good solvent solution can be completed without lowering the flow rate of the good solvent solution. This can prevent evaporation of the good solvent inside the nozzle.

The present inventors have also found that if the good solvent solution and the cleansing poor solvent are alternately introduced into the nozzle, or the good solvent solution and the cleansing poor solvent are mixed and introduced into the nozzle, then not only is blockage of the nozzle minimized during injection of the good solvent solution and upon completion of the injection, but blockage of the nozzle can also be minimized when the flow rate of the good solvent solution has been reduced.

Figure 4:
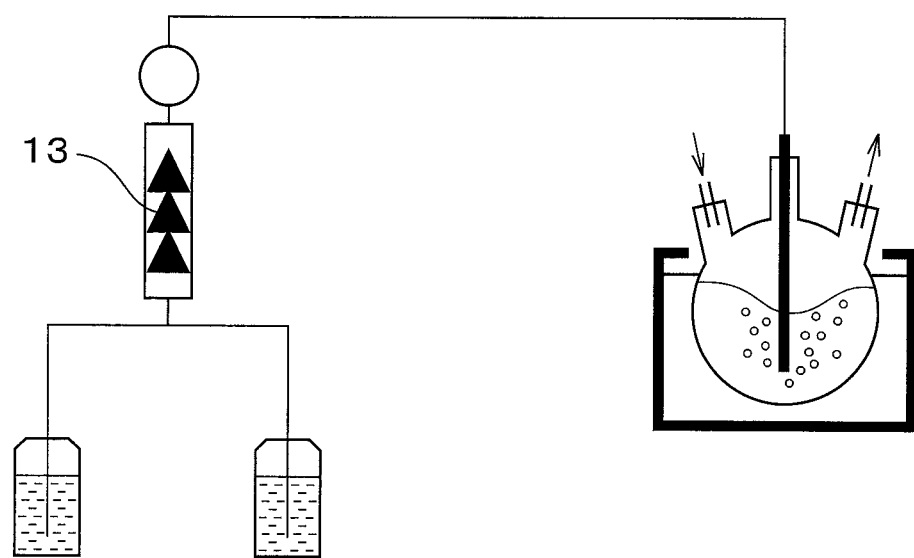
FIG. 4 is a schematic diagram showing an example of an apparatus for carrying out another embodiment of the method of the disclosure.

The method for mixing the good solvent solution and the cleansing poor solvent and introducing them into the nozzle may be the mode illustrated in FIG. 4, for example. In FIG. 4, a static mixer (13) is provided instead of the switching valve of FIG. 1. This allows the good solvent solution (1) and cleansing poor solvent (2) to be mixed by the static mixer (13) when the pump (4) is activated and the good solvent solution (1) and the cleansing poor solvent (2) are introduced into the precipitating poor solvent (10).

FIG. 4 is merely one embodiment of the disclosure, and is not intended to limit the method of the disclosure. Therefore, a dynamic mixer may be used instead of a static mixer.

According to the disclosure, when the good solvent has been injected instead of the cleansing poor solvent, it is difficult to achieve the object of the disclosure. The reason for this is as follows.

When a good solvent with a low boiling point has been used instead of a cleansing poor solvent, the raw material components in the good solvent solution diffuse in the good solvent that has been used instead of the cleansing poor solvent. Thus, immediately after injection with a low flow rate, or after completion of injection, the good solvent that has been used instead of a cleansing poor solvent in the nozzle evaporates, and crystals of the raw material components precipitate on the inner wall of the nozzle, blocking the nozzle.

Incidentally, even when a good solvent with a low boiling point has been used instead of a cleansing poor solvent, blockage of the nozzle does not occur if the flow rate of the liquid in the nozzle is very rapid. In such cases, however, there is a greater decrease in temperature of the precipitating poor solvent by the heat of vaporization when the good solvent contacts with the precipitating poor solvent and evaporates. If the temperature of the precipitating poor solvent is too low, the evaporation rate of the good solvent will fall and the raw material components will slowly undergo crystal growth and precipitate, making it impossible to achieve the object of the disclosure, which is to obtain fine particles in which the plurality of raw material components are highly complexed.

One possible countermeasure against this is to increase the external heat required to maintain at least a constant temperature for the precipitating poor solvent. However, such a countermeasure increases the energy cost necessary for production of the fine particles, and reduces the practicality.

In addition, when a good solvent with a high boiling point has been used instead of a cleansing poor solvent, the good solvent with a high boiling point slowly evaporates in the precipitating poor solvent. Thus, when the good solvent solution is injected into the precipitating poor solvent, the good solvent with a high boiling point remains in the precipitating poor solvent. If a good solvent solution with a low boiling point is injected into the precipitating poor solvent in this state, the raw material components diffuse from the good solvent solution with a low boiling point into the good solvent with a high boiling point. They subsequently precipitate slowly as crystal growth, together with evaporation of the good solvent with a high boiling point. It therefore becomes difficult to obtain fine particles as the object of the disclosure.

<Raw Material Components>

According to the disclosure, a raw material component is a component serving as raw material for particles to be produced by a method for producing particles according to the disclosure. In the case of multiple raw material components, it is possible by the method of the disclosure to obtain fine particles with a plurality of raw material components in a highly complexed state. According to the disclosure, therefore, it is preferred for a plurality of raw material components to be present. According to the disclosure, raw material components that dissolve in the good solvent may be used, and any optional powdered raw material components that disperse in the good solvent may be used.

There are no particular restrictions on the raw material components, and the plurality of raw material components may be used as suits the purpose. For example, when the object is to recover solid solution particles including sulfur, lithium, iodine and bromine as components in solid solution, lithium sulfide, lithium iodide and lithium bromide may be used as raw material components.

<Good Solvent>

A "good solvent" according to the disclosure is a solvent that can dissolve all or some of the raw material components of the disclosure and that has higher solubility for the raw material components than the poor solvent according to the disclosure. The good solvent for the disclosure is not particularly restricted, and methanol, water, toluene and the like may be mentioned as examples.

In particular, methanol may be used when lithium sulfide, lithium iodide and lithium bromide are used as raw material components to obtain a solid electrolyte material. Also, when the raw material components used are water-soluble and have low reactivity with water, water may be used as the good solvent. Also, when organic materials are used as the raw material components, toluene may be used as the good solvent.

<Good Solvent Solution>

The good solvent solution for the disclosure is a solution having the raw material components dissolved in the good solvent. There is no particular restriction on the concentration of the plurality of raw material components in the good solvent solution, but it is preferably a total of 5 g/l or greater, 10 g/l or greater, 20 g/l or greater or 50 g/l or greater. This is because a higher concentration of raw material components in the good solvent solution will allow more highly complexed particles to be obtained. According to the disclosure, the good solvent solution may also be in the form of a slurry further containing at least one type of raw material component powder dispersed in the good solvent.

There is no particular restriction on the flow rate when the good solvent solution is injected into the precipitating poor solvent, and it may be 3 ml/min or higher, 4 ml/min or higher, 5 ml/min or higher or 6 ml/min or higher, and 20 ml/min or lower, 15 ml/min or lower, 10 ml/min or lower, 8 ml/min or lower or 7 ml/min or lower.

The flow rate when the good solvent solution is injected into the precipitating poor solvent is preferably 5 ml/min or higher. This is because if the flow rate is kept at or above a constant rate when the good solvent solution is injected into the precipitating poor solvent, the nozzle will be even less likely to become blocked.

Moreover, the flow rate when the good solvent solution is injected into the precipitating poor solvent is preferably 10 ml/min or lower. This is because if the flow rate is kept at or below a constant rate when the good solvent solution is injected into the precipitating poor solvent, this will reduce the heat necessary to maintain a constant temperature for the precipitating poor solvent by heat of vaporization of the good solvent, allowing the energy cost to be reduced.

<Precipitating Poor Solvent>

The precipitating poor solvent of the disclosure is a solvent having lower solubility for the raw material components than the good solvent. The poor solvent for this case is heated to a temperature higher than the boiling point of the good solvent.

The precipitating poor solvent for the disclosure is not particularly restricted, but since the precipitating poor solvent is heated to a temperature higher than the boiling point of the good solvent, a solvent having a higher boiling point than the boiling point of the good solvent is used. In particular, the precipitating poor solvent used is preferably a solvent with a boiling point of at least 165° C. higher than that of the good solvent. Specific examples for the precipitating poor solvent include dodecane (boiling point: approximately 216° C.) and tridecane (boiling point: approximately 235° C.), as solvents with relatively high boiling points. However, the precipitating poor solvent is preferably selected in consideration of the relationship with the boiling point of the good solvent used for the disclosure. Specifically, it is preferred to select a precipitating poor solvent having a boiling point of at least 165° C. higher than the boiling point of the good solvent. For example, when the good solvent used is methanol (boiling point: approximately 65° C.), the precipitating poor solvent that is selected may be tridecane (boiling point: approximately 235° C.)

The precipitating poor solvent is preferably heated to a temperature of at least 165° C. higher. This is because the evaporation rate of the good solvent will be more rapid the higher the temperature of the precipitating poor solvent is above the boiling point of the good solvent. The difference between the boiling point of the good solvent and the temperature to which the precipitating poor solvent is heated may be 170° C. or more, 175° C. or more, 180° C. or more or 190° C. or more.

There are no particular restrictions on the heating method, and any method may be used so long as it is a method that can heat the precipitating poor solvent to the target temperature. For example, the precipitating poor solvent may be heated using an oil bath.

Since a higher precipitating poor solvent temperature above the boiling point of the good solvent will result in a more rapid evaporation rate of the good solvent, the temperature has no particular upper limit, but the temperature of the precipitating poor solvent that has been heated is preferably no higher than the boiling point of the precipitating poor solvent.

<Nozzle>

According to the disclosure, the good solvent solution is injected through the nozzle, thereby evaporating the good solvent and precipitating a plurality of particles. The nozzle is not particularly restricted so long as it is in a form allowing the good solvent solution to be injected into the precipitating poor solvent. The nozzle has, for example, a construction with a tube-like shape, allowing the liquid to pass through the interior of the tube. An injecting nozzle may be mentioned as a specific example of such a nozzle.

<Cleansing Poor Solvent>

According to the disclosure, the cleansing poor solvent is a solvent with lower solubility for each of the raw material components than the good solvent used in the good solvent solution. Examples for the cleansing poor solvent include dodecane, tridecane and the like.

The cleansing poor solvent preferably has a boiling point at or above the temperature of the precipitating poor solvent. This is because when the boiling point of the cleansing poor solvent is higher than the temperature of the precipitating poor solvent, there will be no reduction in temperature of the precipitating poor solvent by the heat of vaporization of the cleansing poor solvent, and it will be easier to maintain the temperature of the precipitating poor solvent.

Moreover, the cleansing poor solvent used is preferably the same as the precipitating poor solvent. This is in order to allow easy reuse even after the cleansing poor solvent has been injected into the precipitating poor solvent.

EXAMPLES

Presence or Absence of Nozzle Blockage

Reference Examples 1 to 4, Examples 1 to 3

As described below, the good solvent solution was injected through the nozzle into the precipitating poor solvent that had been heated to high temperature, and the presence or absence of nozzle blockage was observed. Reference Examples 1 to 4 and Examples 1 and 2 were carried out using an apparatus as illustrated in FIG. 1. Example 3 was carried out using an apparatus as illustrated in FIG. 4.

Reference Example 1

Lithium sulfide, lithium iodide and lithium bromide (molar ratio=6:1:1), as raw material components, were dissolved in methanol (boiling point: 65° C.) as the good solvent, to a raw material component concentration of 50 g/l in the good solvent solution, to prepare a good solvent solution dissolving the raw material components.

After placing 350 ml of tridecane (boiling point: approximately 235° C.) as the precipitating poor solvent solution in a 500 ml round bottom flask, it was placed in an oil bath that had been heated to 230° C., and heated.

After the temperature of the precipitating poor solvent had stabilized to 230° C., the switching valve was set to allow injection of the good solvent solution, and the pump was activated to cause the good solvent solution to flow through the tubing into the nozzle, so that the good solvent solution was injected through the nozzle into the precipitating poor solvent. Incidentally, the flow rate when the good solvent solution is injected into the precipitating poor solvent was 10 ml/min.

The nozzle became blocked after about 8 seconds from the start of injection.

Example 1

A good solvent solution was injected into a precipitating poor solvent in the same manner as Reference Example 1, except that tridecane was injected as the cleansing poor solvent into the nozzle, before and after injection of the good solvent solution into the precipitating poor solvent. Specifically, the injection was carried out in the following manner.

First, the switching valve was set to allow injection of the cleansing poor solvent, and the pump was activated to cause the cleansing poor solvent to flow into the tubing, filling the tubing interior with the cleansing poor solvent. Next, the switching valve was switched to allow injection of the good solvent solution, causing the good solvent solution to flow into the tubing, and the cleansing poor solvent and good solvent solution were injected through the nozzle into the precipitating poor solvent. When flowing in of the good solvent solution was complete, the switching valve was switched to allow injection of the cleansing poor solvent, and the cleansing poor solvent was flowed into the nozzle.

Injection was continued for 10 minutes after the start of injection, but there was no blockage of the nozzle. Incidentally, the flow rates of the good solvent solution and the cleansing poor solvent were both 10 ml/min.

Upon completion of the injection, the apparatus was disassembled and the nozzle was observed, and no solid adhesion was found in the nozzle.

Reference Example 2

A good solvent solution was injected into a precipitating poor solvent in the same manner as Reference Example 1, except that the flow rate during injection of the good solvent solution into the precipitating poor solvent was 5 ml/min.

The nozzle became blocked in less than about 1 second from the start of injection.

Example 2

A good solvent solution was injected into a precipitating poor solvent in the same manner as Reference Example 2, except that a cleansing poor solvent was injected before and after injecting the good solvent solution into the precipitating poor solvent, and the good solvent solution and poor solvent solution were alternately injected. Specifically, the injection was carried out in the following manner.

First, the switching valve was set to allow injection of the cleansing poor solvent, and the pump was activated to cause the cleansing poor solvent to flow into the tubing, filling the tubing interior with the cleansing poor solvent. Next, the switching valve was switched to allow injection of the good solvent solution, causing the good solvent solution to flow into the tubing, and the cleansing poor solvent and good solvent solution were injected through the nozzle into the precipitating poor solvent.

Next, the switching valve was switched every 2 seconds, approximately, for alternating flow of the good solvent solution and the cleansing poor solvent. When flowing in of the good solvent solution was complete, the switching valve was switched to allow injection of the cleansing poor solvent, and the cleansing poor solvent was introduced into the nozzle. Incidentally, the flow rates of the good solvent solution and the cleansing poor solvent were both 5 ml/min.

Injection was continued for 15 minutes after the start of injection, but there was no blockage of the nozzle. Upon completion of the injection, the apparatus was disassembled and the nozzle was observed, and no solid adhesion was found in the nozzle.

Example 3

A good solvent solution was injected into a precipitating poor solvent in the same manner as Reference Example 2, except that the good solvent solution and the cleansing poor solvent were mixed with a static mixer, using the apparatus illustrated in FIG. 4, and injected into the precipitating poor solvent.

Specifically, the pump was activated to cause the good solvent solution and the cleansing poor solvent to flow into the static mixer, the good solvent solution and cleansing poor solvent were mixed and caused to flow into the tubing, and the cleansing poor solvent and the good solvent solution were injected through the nozzle into the precipitating poor solvent. Incidentally, the flow rates of the good solvent solution and the cleansing poor solvent were both 5 ml/min. The mixing ratio of the good solvent solution and the precipitating poor solvent was 1:1, as the volume ratio.

Similar to Example 2, injection was continued for 15 minutes after the start of injection, but there was no blockage of the nozzle. Upon completion of the injection, the apparatus was disassembled and the nozzle was observed, and no solid adhesion was found in the nozzle.

Reference Example 3

A good solvent solution was injected into a precipitating poor solvent in the same manner as Example 1, except that the good solvent methanol was used instead of the cleansing poor solvent.

The nozzle became blocked after about 11 seconds from the start of injection.

Reference Example 4

A good solvent solution was injected into a precipitating poor solvent in the same manner as Reference Example 3, except that the flow rate of the good solvent solution and the cleansing good solvent was 20 ml/min.

Injection was continued for 5 minutes after the start of injection, but there was no blockage of the nozzle. However, the temperature of the precipitating poor solvent fell immediately after the start of injection, and fell to 156° C. 5 minutes thereafter.

<Discussion>

Table 1 below shows the experimental conditions and results for Reference Examples 1 to 4 and Examples 1 to 3. In Table 1, the "cleansing solution" is the good solvent used instead of the cleansing poor solvent or cleansing poor solvent.

TABLE 1

| | | Experimental conditions | | | | Results | |
|---|---|---|---|---|---|---|---|
| | Injection method | Good solvent | Cleansing solution | Flow rate (ml/min) | Precipitating poor solvent | Time to blockage | Presence/absence of blockage |
| Example 1 | Injection of cleansing solution before and after | Methanol | Tridecane | 10 | Tridecane | — (Complete after 10 min) | Absent |
| Reference Example 1 | No cleansing solution | Methanol | None | 10 | Tridecane | Blockage after 8 sec | Present |
| Example 2 | Injection of cleansing solution before and after, and alternate injection of good solvent solution and cleansing solution | Methanol | Tridecane | 5 | Tridecane | — | Absent (Complete after 15 min) |
| Example 3 | Injection of cleansing solution before and after, and mixing and injection of good solvent solution and cleansing solution | Methanol | Tridecane | 5 | Tridecane | — (Complete after 15 min) | Absent |
| Reference Example 2 | No cleansing solution | Methanol | None | 5 | Tridecane | Blockage in less than 1 sec | Present |
| Reference Example 3 | Injection of cleansing solution before and after | Methanol | Methanol | 10 | Tridecane | Blockage after 11 sec | Present |
| Reference Example 4 | Injection of cleansing solution before and after | Methanol | Methanol | 20 | Tridecane | — (Reduction in liquid temperature) | Absent |

1. Effect by Injection of Cleansing Poor Solvent

In the case of Reference Example 1, where the cleansing poor solvent was not sent through the nozzle before injecting the good solvent solution into the precipitating poor solvent, the nozzle became blocked after 8 seconds from the start of injection.

When injection was initiated with a low flow rate, the evaporation rate of the good solvent solution was more rapid than the flow rate of the good solvent solution flowing through the nozzle. Consequently, it is believed that the good solvent solution in the nozzle contacted with the heated precipitating poor solvent and evaporated, and crystals of the raw material component precipitated on the nozzle inner wall so that the nozzle became blocked.

In contrast, in Example 1 where the cleansing poor solvent was sent through the nozzle before injection of the good solvent solution into the precipitating poor solvent, the nozzle did not become blocked. This is thought to be because after the flow rate in the nozzle stabilized, the good solvent solution flowed through the nozzle, and therefore the good solvent solution evaporated after having flowed from the nozzle into the precipitating poor solvent, such that crystals of the raw material components did not precipitate on the inner wall of the nozzle and the nozzle did not become blocked.

2. Method of Injecting Cleansing Poor Solvent, and its Effect

In Reference Example 2, the flow rate of the good solvent solution was lower than in Reference Example 1, and therefore blockage occurred within less than about 1 second from the start of injection. In contrast, blockage of the nozzle did not occur in Example 2, in which the flow rate was the same as Reference Example 2 but the good solvent solution and cleansing poor solvent were alternately injected, and in Example 3, in which the flow rate was the same as Reference Example 2 but the good solvent solution and cleansing poor solvent were mixed and injected.

In Examples 2 and 3, the cleansing poor solvent was flowed through the nozzle before and after injection of the good solvent solution into the precipitating poor solvent, and during or simultaneously with injection of the good solvent solution, unlike in Reference Example 2. The reason why this mode can prevent blockage of the nozzle is believed to be as follows.

When the flow rate of the good solvent solution is low as in Reference Example 2, the evaporation rate of the good solvent in the good solvent solution is more rapid than the flow rate of the good solvent solution, and therefore the precipitating poor solvent may become trapped inside the nozzle. When the precipitating poor solvent becomes trapped inside the nozzle, the good solvent solution and the precipitating poor solvent come into contact inside the nozzle, and the good solvent evaporates, leaving precipitation of crystals of the raw material component on the inner wall of the nozzle.

In contrast, in Example 2, the good solvent solution and the cleansing poor solvent are alternately introduced into the nozzle. Thus, even when the precipitating poor solvent has become trapped inside the nozzle, inflow of the cleansing poor solvent into the nozzle at a fixed interval causes the precipitating poor solvent to be extruded out of the nozzle. Thus, precipitation of the raw material components on the inner wall of the nozzle can be minimized.

Moreover, in Example 3, the good solvent solution and the cleansing poor solvent are mixed with a static mixer and injected into the nozzle. In Example 3, the cleansing poor solvent does not evaporate even when contacting with the precipitating poor solvent, and introduction of the precipitating poor solvent into the nozzle can be prevented. This can prevent precipitation of the crystals of the raw material component on the inner wall of the nozzle.

3. Presence or Absence of Blockage Depending on Type of Cleansing Solution

In Example 1 which used tridecane as the cleansing poor solvent, injection of the good solvent solution into the precipitating poor solvent was continued for 10 minutes, but no blockage occurred. In contrast, in Reference Example 3 which used methanol as a good solvent instead of a cleansing poor solvent, despite introducing a cleansing good solvent before injection of the good solvent solution into the poor solvent solution, the nozzle became blocked after about 11 seconds from the start of injection, and it was not possible to prevent blockage of the nozzle.

In the method of Reference Example 3, the good solvent solution and the cleansing good solvent were in contact before introducing the good solvent solution into the nozzle, and the raw material components in the good solvent solution diffused in the cleansing good solvent. Thus, at the initial stage of injection in which the flow rate has not stabilized, the cleansing good solvent in which the raw material components have dissolved evaporates inside the nozzle, and crystals of the raw material component precipitate inside the nozzle. When the good solvent solution in this state flows into the nozzle, crystals of the raw material components gradually grow with the crystals of the raw material components on the inner wall of the nozzle as nuclei. This results in blockage of the nozzle.

Even when a good solvent has been used instead of a cleansing poor solvent, it is thought that blockage of the nozzle can be minimized if the flow rate is sufficiently high. In Reference Example 4, for example, it was possible to minimize blockage of the nozzle. However, in Reference Example 4, the temperature of the precipitating poor solvent fell to 156° C. According to the disclosure, the goal is to obtain fine particles of the raw material components by maintaining a high temperature for the precipitating poor solvent. Therefore, in the method of Reference Example 4 in which the temperature fell markedly after injection of the good solvent solution for only 5 minutes, it was difficult to achieve the object of the disclosure.

Particles Obtained by Method of the Disclosure

Example 1 and Comparative Example 1

Example 1 and Comparative Example 1

The particles obtained by the method of Example 1 and particles obtained by a common method using a good solvent and poor solvent, as Comparative Example 1, were measured by X-ray diffraction (XRD) and the crystal structures were compared. Comparative Example 1 was carried out in the following manner.

First, as the raw material components, lithium hydrosulfide, lithium iodide and lithium bromide were dissolved in 1-pentanol (boiling point: 138° C.) to prepare a good solvent solution. The solution was mixed with tridecane as a poor solvent to prepare a mixed solution, which was placed in a round bottom flask. The blending ratio of the good solvent solution and tridecane was 1:1, as the volume ratio.

Next, the round bottom flask containing the mixed solution was placed in an oil bath and heated to 190° C., and the 1-pentanol was evaporated while simultaneously obtaining particles of the raw material components.

Lithium sulfide is poorly soluble in 1-pentanol. In Comparative Example 1, therefore, unlike Example 1, lithium hydrosulfide was used instead of lithium sulfide. The lithium hydrosulfide was desulfurized during continuous heating either during crystallization or after crystallization, and was converted to lithium sulfide. Thus, the particles obtained by the method of Comparative Example 1 essentially included lithium sulfide.

<Results>

Figure 5:
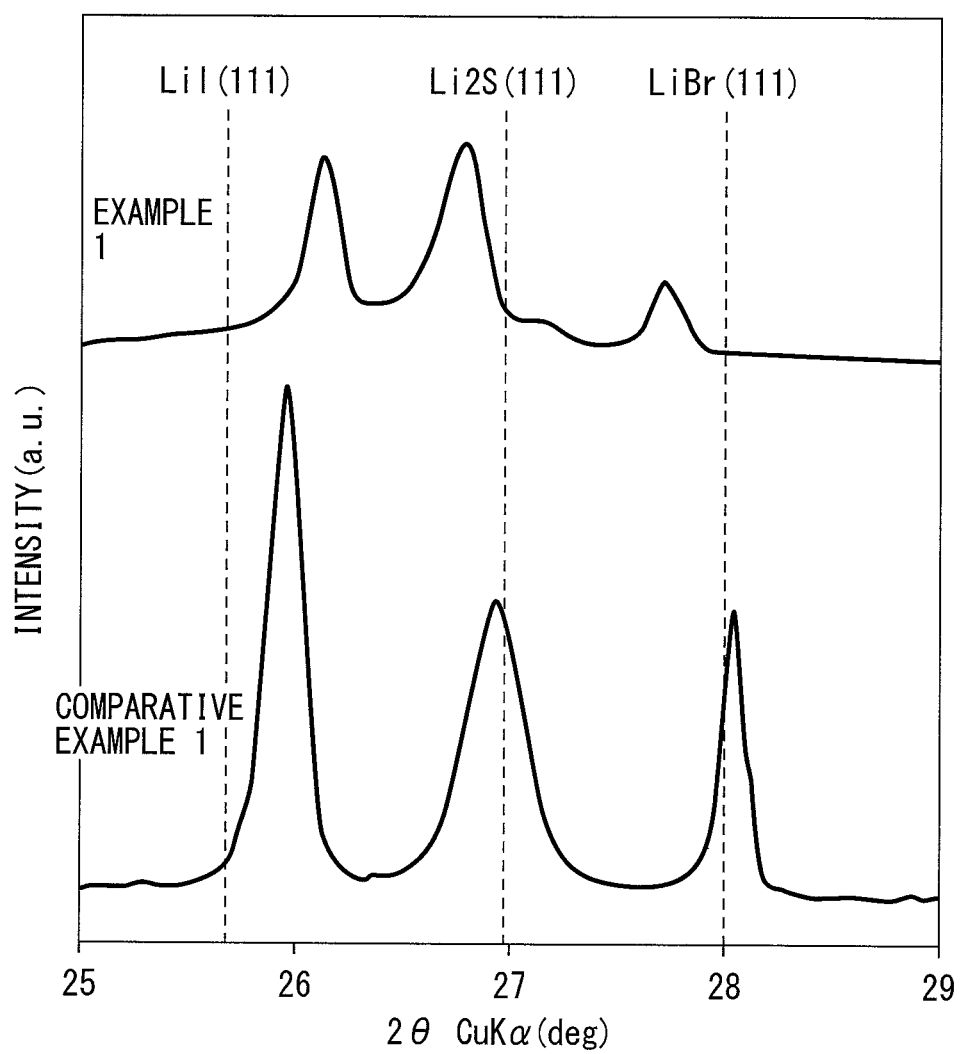
FIG. 5 is a diagram showing the measurement results for X-ray diffraction of particles obtained by the methods of Example 1 and Comparative Example 1.

FIG. 5 is a graph showing the results of XRD measurement for Example 1 and Comparative Example 1. In the graph, the upper curve represents the XRD measurement results for Example 1. The lower curve represents the XRD measurement results for Comparative Example 1.

In Example 1, peaks appeared for each of the locations of $2\theta=26.17°$, $26.74°$ and $27.70°$. In Comparative Example 1, on the other hand, peaks appeared for each of the locations of $2\theta=26.00°$, $26.90°$ and $28.04°$. In FIG. 5, each peak of the precipitates obtained by the method in the examples are peaks for lithium iodide, lithium sulfide and lithium bromide, in that order from the left, and likewise each peak for the precipitates obtained by the method in the comparative examples are peaks for lithium iodide, lithium sulfide, lithium bromide, in that order from the left.

<Discussion>

The precipitate obtained by the method of Example 1 had the lithium iodide peak shifted to the right compared to the precipitate obtained by the method of Comparative Example 1, while the peaks for lithium sulfide and lithium bromide were shifted to the left. This is believed to be because lithium iodide, lithium sulfide and lithium bromide are in mutual solid solution and had similar lattice constants.

In addition, the peak intensity of the precipitate obtained by the method of Example 1 was lower than the peak intensity of the precipitate obtained by the method of Comparative Example 1, and the skirt was widened. This indicates that the crystals composing the particles were more micronized than in the precipitate of Comparative Example 1.

EXPLANATION OF SYMBOLS

1 Good solvent solution
2 Cleansing poor solvent
3 Switching valve
4 Pump
5 Tubing
6 Nozzle
7 Gaseous mixture of Ar gas and good solvent vapor
8 Ar gas
9 Good solvent vapor
10 Precipitating poor solvent
11 Oil bath
12 Heated oil
13 Static mixer
20 Good solvent solution
21 Good solvent vapor
22 Fine particles of raw material components
23 Raw material component crystals
25 Nozzle

What is claimed is:

1. A method for producing particles, the method comprising:
    injecting a good solvent solution that comprises a good solvent and one or more raw material components dissolved in the good solvent, through a nozzle into a precipitating poor solvent that has been heated to a temperature higher than the boiling point of the good solvent, to evaporate the good solvent and precipitate a plurality of particles, and
    running a cleansing poor solvent through the nozzle before starting and after completing injection of the good solvent solution into the precipitating poor solvent.

2. A method for producing particles according to claim 1, further comprising running the good solvent solution and the cleansing poor solvent through the nozzle in an alternating manner.

3. A method for producing particles according to claim 1, further comprising mixing the good solvent solution and the cleansing poor solvent and running them through the nozzle.

4. A method for producing particles according to claim 1, wherein the cleansing poor solvent has a boiling point that is at or above the temperature of the precipitating poor solvent that has been heated.

5. A method for producing particles according to claim 4, wherein the cleansing poor solvent and the precipitating poor solvent are the same.

6. A method for producing particles according to claim 1, wherein the temperature of the precipitating poor solvent that has been heated is at least 165° C. higher than the boiling point of the good solvent.

7. A method for producing particles according to claim 1, wherein a plurality of different raw material components are dissolved in the good solvent.

8. A method for producing particles according to claim 7, wherein the plurality of different raw material components are lithium sulfide and lithium halides.

9. A method for producing particles according to claim 8, wherein the lithium halides are lithium iodide and lithium bromide.

10. A method for producing particles according to claim 1, wherein the good solvent solution is in the state of a slurry further comprising at least one type of raw material component in powdered form, dispersed in the good solvent.

11. A method for producing particles according to claim 1, wherein the concentration of the one or more raw material components in the good solvent solution is 10 g/l or greater.

12. A method for producing particles according to claim 1, wherein the flow rate of the good solvent during injection of the good solvent solution into the precipitating poor solvent is between 5 ml/min and 10 ml/min, inclusive.

* * * * *